United States Patent
Nakajima

[11] Patent Number: 5,922,949
[45] Date of Patent: Jul. 13, 1999

[54] WHEEL ROTATIONAL VELOCITY SIGNAL PROCESSING APPARATUS USED FOR DETECTION OF REDUCTION IN TIRE AIR PRESSURE

[75] Inventor: Yoshio Nakajima, Osaka, Japan

[73] Assignees: Sumitomo Electric Industries, Ltd., Osaka; Sumitomo Rubber Industries, Ltd., Hyoco, both of Japan

[21] Appl. No.: 08/886,944

[22] Filed: Jul. 2, 1997

[30] Foreign Application Priority Data

Aug. 30, 1996 [JP] Japan .................................. 8-230564

[51] Int. Cl.$^6$ .................................................. B60C 23/00
[52] U.S. Cl. ........................ 73/146.5; 340/444; 73/146.2
[58] Field of Search .................... 73/146, 146.5, 73/146.4, 146.2; 340/444

[56] References Cited

U.S. PATENT DOCUMENTS

| | | | |
|---|---|---|---|
| 534,741 | 9/1895 | Nishihara et al. | 340/444 |
| 5,252,946 | 10/1993 | Walker et al. | 340/444 |
| 5,578,984 | 11/1996 | Nakajima | 73/146.5 |
| 5,629,478 | 5/1997 | Nakajima et al. | 73/146.2 |
| 5,710,539 | 1/1998 | Iida | 73/146.5 |

FOREIGN PATENT DOCUMENTS

| | | |
|---|---|---|
| 0512745A1 | 11/1992 | European Pat. Off. . |
| 0652144A1 | 5/1995 | European Pat. Off. . |
| 0656268A1 | 6/1995 | European Pat. Off. . |
| 19619 93A1 | 7/1995 | Germany . |

*Primary Examiner*—Max H. Noori
*Attorney, Agent, or Firm*—Rabin & Champagne, P.C.

[57] ABSTRACT

An ABS microcomputer 16 counts the number of pulses given between two counted times and executes a specific processing based on the data of pulse number and pulse counting period. The DWS microcomputer 21 receives the data of pulse number and pulse counting period of the ABS microcomputer 16 through the communication line 17 to calculate the rotational angular velocities of the tires based on the data of pulse number and pulse counting period so that the calculated rotational angular velocities of the four tires are compared with one another to detect whether or not there is a tire reduced in air pressure.

5 Claims, 12 Drawing Sheets

WHEEL ROTATIONAL VELOCITY SIGNAL PROCESSING APPARATUS USED FOR DETECTION OF REDUCTION IN TIRE AIR PRESSURE

BACKGROUND OF THE INVENTION

This application is based on application No. 8-230564 filed in Japan.

FIELD OF THE INVENTION

The present invention relates to a wheel rotational velocity signal processing apparatus used for detection of reduction in tire air pressure for a four-wheel motor vehicle.

DESCRIPTION OF THE RELATED ART

As one of safety means for a four-wheel motor vehicle such as a passenger car, truck or the like, there is developed an apparatus for detecting a reduction in tire air pressure.

A tire air pressure reduction detecting apparatus (referred to as DWS (Deflation Warning System)), is arranged to detect a rotational angular velocity of each of the four tires and to detect, based on the rotational angular velocity of each tire, a tire relatively reduced in air pressure (For example, Japanese Patent Laid-Open Publication No. 63-305011 (1988)).

Such a tire air pressure reduction detecting apparatus of prior art is arranged such that the respective rotational angular velocities of the four tires are obtained using wheel rotational velocity sensors for detecting the rotational states of the four tires respectively, that the average value of the rotational angular velocities of one pair of diagonally disposed tires is subtracted from the average value of the rotational angular velocities of another pair of diagonally disposed tires, and that when the difference thus obtained is not less than 0.6 %, preferably not less than 0.3 %, of the average value of the rotational angular velocities of the four tires, a tire reduced in air pressure is detected.

On the other hand, for safe driving of a motor vehicle, an ABS (Antilock-Braking-System) is used and now its use has been increasing rapidly. ABS is a system which comprises wheel rotational velocity sensors for detecting the rotational states of the four tires, respectively, and which is arranged to detect whether or not each tire is in a slip state of idle running, thereby to control the braking hydraulic pressure.

Since both the tire air pressure reduction detecting apparatus (hereinafter referred to as DWS) and the ABS utilize wheel rotational velocity sensors, it has been consider to that the share the wheel rotational velocity sensors of the DWS with the ABS.

Figure 12:
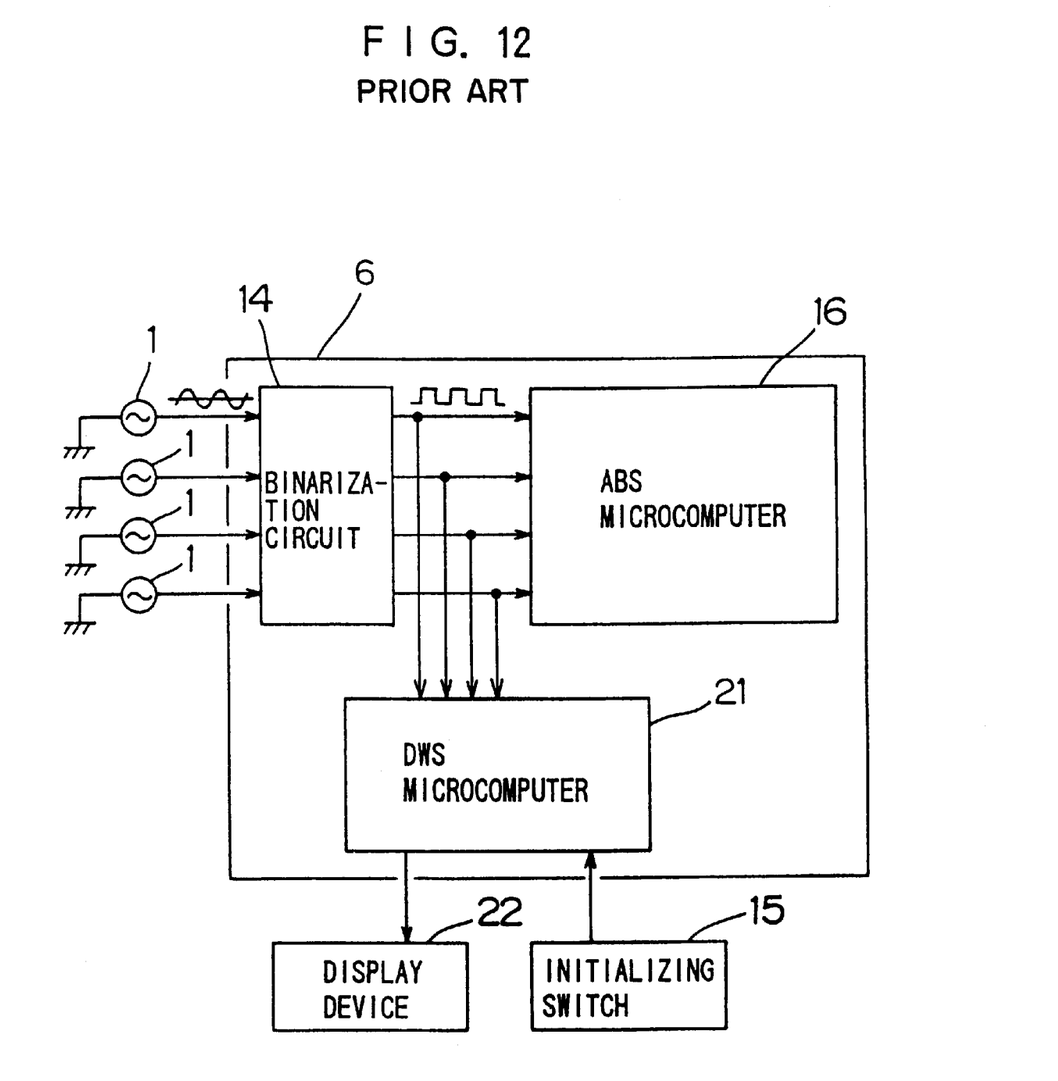
FIG. 12 is a block diagram of an electric arrangement of conventional ABS and DWS which share wheel rotational velocity sensors with each other.

As shown in FIG. 12, when the wheel rotational velocity sensors are commonly used, detection signals of four wheel rotational velocity sensors 1 are shaped through a binarization circuit 14 and then supplied to an ABS microcomputer 16 and a DWS microcomputer 21. Each of the two microcomputers 16, 21 executes a specific process according to the task thereof (See U.S. Pat. No. 5,591,906).

With the DWS sharing the wheel rotational velocity sensors with the ABS, the detection signals of the wheel rotational velocity sensors 1 are binarized by the binarization circuit 14 and then supplied, as wheel rotational velocity pulses, to the DWS microcomputer 21.

According to this arrangement, it is required to dispose, in the DWS microcomputer 21, an input interface circuit which interlocks with a timer for latching pulses. This not only complicates the arrangement, but also requires a high-performance microcomputer.

SUMMARY OF THE INVENTION

It is an object of the present invention to provide, in a tire air pressure reduction detecting apparatus for a four-wheel motor vehicle having four tires, a tire air pressure reduction detecting apparatus capable of using a simple microcomputer requiring no input interface circuit.

A tire air pressure reduction detecting apparatus according to the present invention comprises a first microcomputer which is connected to pulse output means to count numbers of pulses supplied between two pulse counting time points, thereby executing a specific process based on data of the numbers of pulses and a pulse counting period; and a second microcomputer which receives the data of the numbers of pulses and pulse counting period stored in the first microcomputer through a communication line connected therebetween to calculate the rotational angular velocities of the four tires based on the received data and to compare the calculated rotational angular velocities of the four tires with one another, thereby to detect whether or not there is a tire reduced in air pressure.

According to the arrangement above-mentioned, the second microcomputer for detecting whether or not there is a tire reduced in air pressure, i.e., the tire air pressure reduction detecting microcomputer, receives, as numerical information, data of pulse number and pulse counting period from the first microcomputer which executes specific processing. Therefore, the tire air pressure reduction detecting microcomputer does not require an input interface circuit which interlocks a timer for latching pulses.

Accordingly, this microcomputer is simple in arrangement as compared with a conventional microcomputer requiring an input interface circuit. Thus, an economical microcomputer can be adopted. Further, the wiring lines are reduced in number to increase the degree of freedom in the layout of the printed circuit board. This enables the microcomputer to be miniaturized.

In the tire air pressure reduction detecting apparatus, the communication line may be a serial communication line, and communication between the first and second microcomputers may be conducted such that the data of pulse number and pulse counting period for the four wheels are transmitted during a single communication processing.

Further, communication between the first and second microcomputers may be conducted such that data of pulse number and pulse counting period for two wheels out of the four wheels are transmitted by a single communication process and data of pulse number and pulse counting period for rest of two wheels are transmitted in a succeeding communication process, or such that data of pulse number and pulse counting period for each of the four wheels are transmitted by a single communication process.

According to such communication processing, the broad effects produced by the invention can be produced and it is possible to switch, in time division, the wheel to which data are transmitted. This reduces the amount of communication per a single communication process, thus reducing the overheads costs otherwise increased by having to arrange for the apparatus transmit data of wheel rotational velocity and time between microcomputers.

The second microcomputer may be arranged to accumulate, for a predetermined period of time, the data of pulse number and pulse counting period received from the first microcomputer through the communication line, and to execute a tire air pressure reduction detection process based on the accumulated data of pulse number and pulse counting period.

According to the arrangement above-mentioned, it is possible to absorb a difference between a counting cycle of the first microcomputer for executing a specific process and a counting cycle of the tire air pressure reduction detecting microcomputer. This enables the operational source to be used in common.

The longer a period of time during which data of pulse number and pulse counting period are accumulated is, the higher the precision of calculation of rotational angular velocity is. On the contrary, when this period of time is excessively long, the number of iteration times for the calculation of rotational angular velocity is reduced. Accordingly, this period of time may be determined dependent on the requirements for the tire air pressure reduction detection process.

These and other features, objects and advantages of the present invention will be more fully apparent from the following detailed description set forth below when taken in conjunction with the accompanying drawings.

DESCRIPTION OF THE PREFERRED EMBODIMENTS

Figure 1:
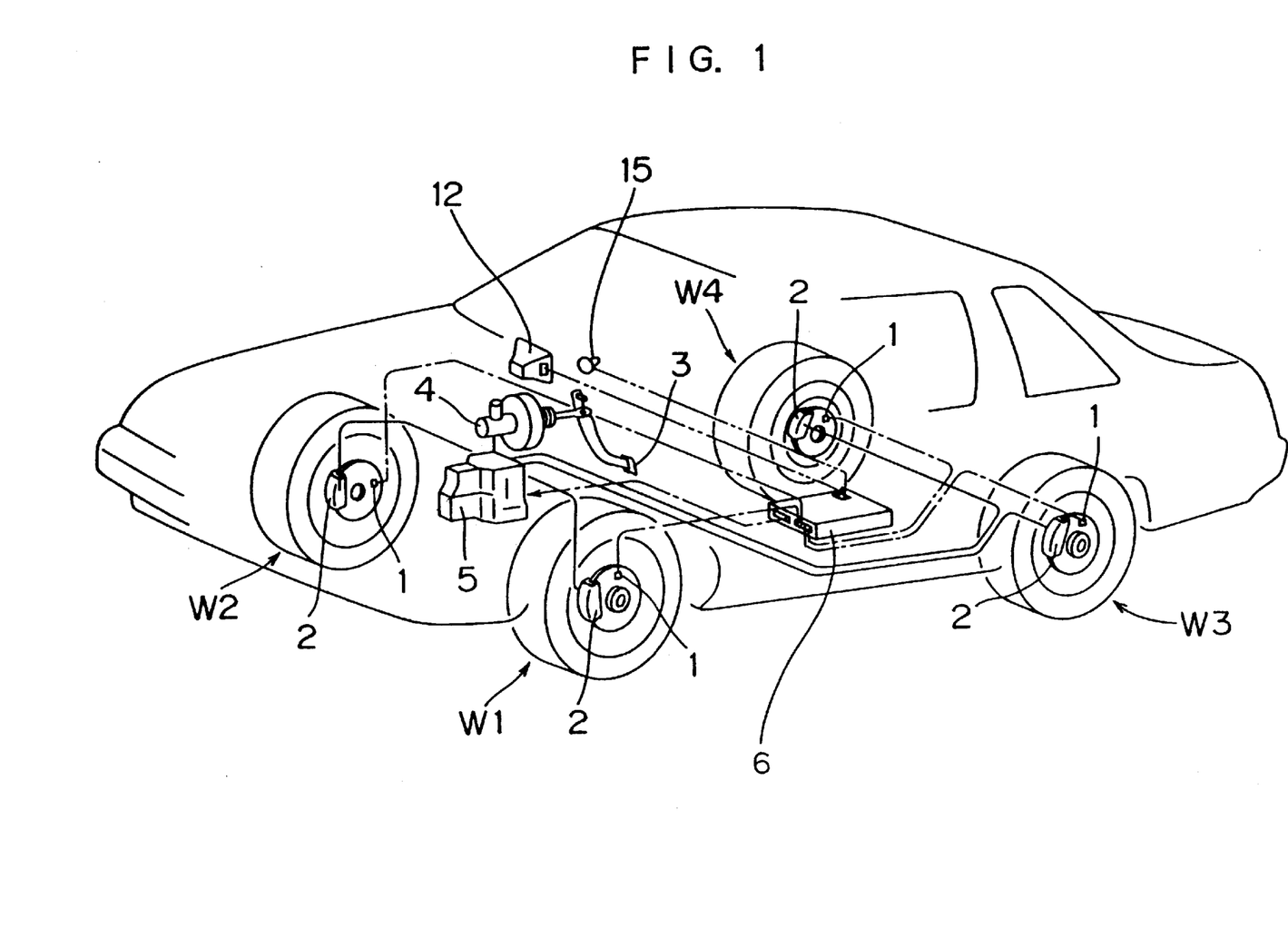
FIG. 1 is a schematic view illustrating a motor vehicle on which mounted are an ABS of prior art and a tire air pressure reduction detecting apparatus according to an embodiment of the present invention.

FIG. 1 is a schematic view illustrating a motor vehicle on which are mounted an ABS of prior art and a tire air pressure reduction detecting apparatus according to an embodiment of the present invention.

The ABS mounted on the motor vehicle is arranged such that the braking pressure of brakes 2 of the wheels is electronically controlled based on the outputs of wheel rotational velocity sensors 1 respectively disposed with respect to the four tires W1, W2, W3, W4, thereby to prevent the wheels from being locked when the brakes are suddenly applied or the like.

When a braking pedal 3 is strongly depressed, the hydraulic pressure from a master cylinder 4 is transmitted to the brakes 2 of the wheels through a hydraulic unit 5 connected to a processing unit 6, for monitoring the outputs of the four wheel rotational velocity sensors 1. In the processing unit 6, an analog signal in the form of a sine wave supplied from each wheel rotational velocity sensor 1, is binarized and converted into a binarized wheel rotational velocity signal (hereinafter referred to as wheel rotational velocity pulse). The processing unit 6 is arranged such that, when a so-called locked state of any of the wheels is detected based on each of the wheel rotational velocity pulses, the hydraulic unit 5 is controlled to intermittently reduce the braking pressure of the brake 2 of the locked wheel.

On the other hand, the DWS according to this embodiment comprises the processing unit 6, a display device 12 connected to the processing unit 6, and an initializing switch 15 which is connected to the processing unit 6 and which is to be operated by the driver. The processing unit 6 is arranged to receive information of wheel rotational velocity pulse number and to detect, based on the received information, a reduction in air pressure of any of the tires W1, W2, W3, W4. If a reduction in air pressure of any of the tires W1, W2, W3, W4 is detected, the detection result is displayed on the display device 12. Thus, the display device 12 displays the tire whose air pressure has been reduced.

As apparent from the foregoing, the processing unit 6 is arranged to achieve two functions, i.e., an ABS control function and a DWS control function. This reduces the number of component elements. Advantageously, this not only reduces the size of the circuit arrangement but also lowers the cost.

Figure 2:
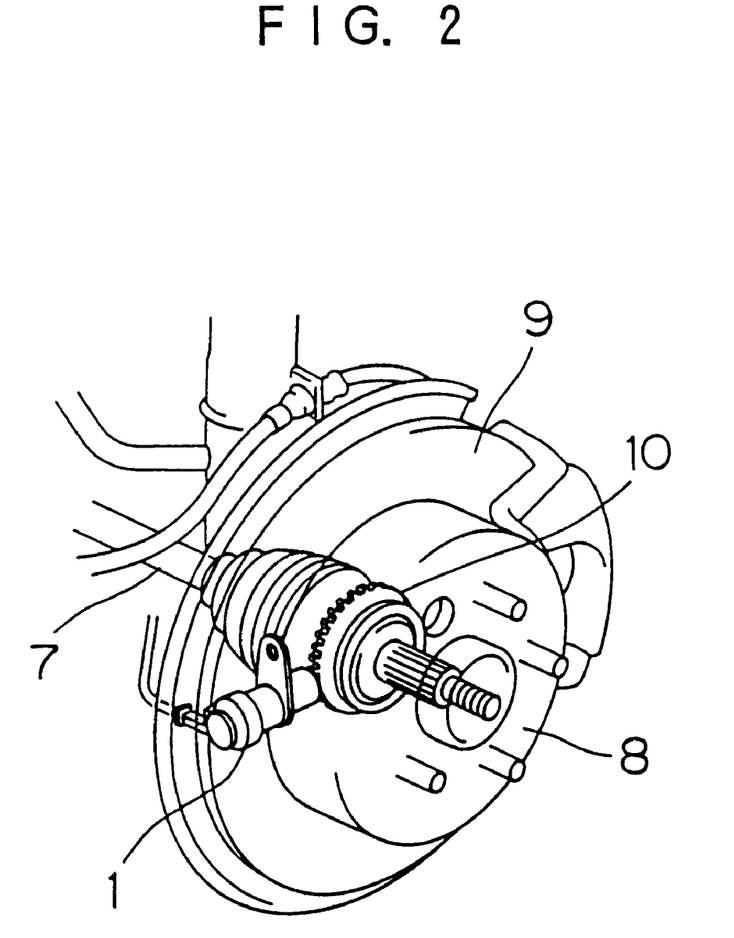
FIG. 2 is a perspective view illustrating an example of a structure of attaching a wheel rotational velocity sensor 1 to be discussed in connection with FIG. 1.

FIG. 2 is a perspective view illustrating an example of a structure of attaching a wheel rotational velocity sensor 1 discussed in connection with FIG. 1. Fixed to an end of an axle 7 are a wheel attaching member 8 and a brake disk 9. A sensor rotor 10 rotatable integrally with the axle 7 is disposed at the inside of the brake disk 9. The sensor rotor 10 is provided on the whole periphery thereof with a plurality of teeth at a regular pitch. The wheel rotational velocity sensor 1 is immovably disposed opposite to the peripheral surface of the sensor rotor 10 with a predetermined distance provided therebetween.

Figure 3:
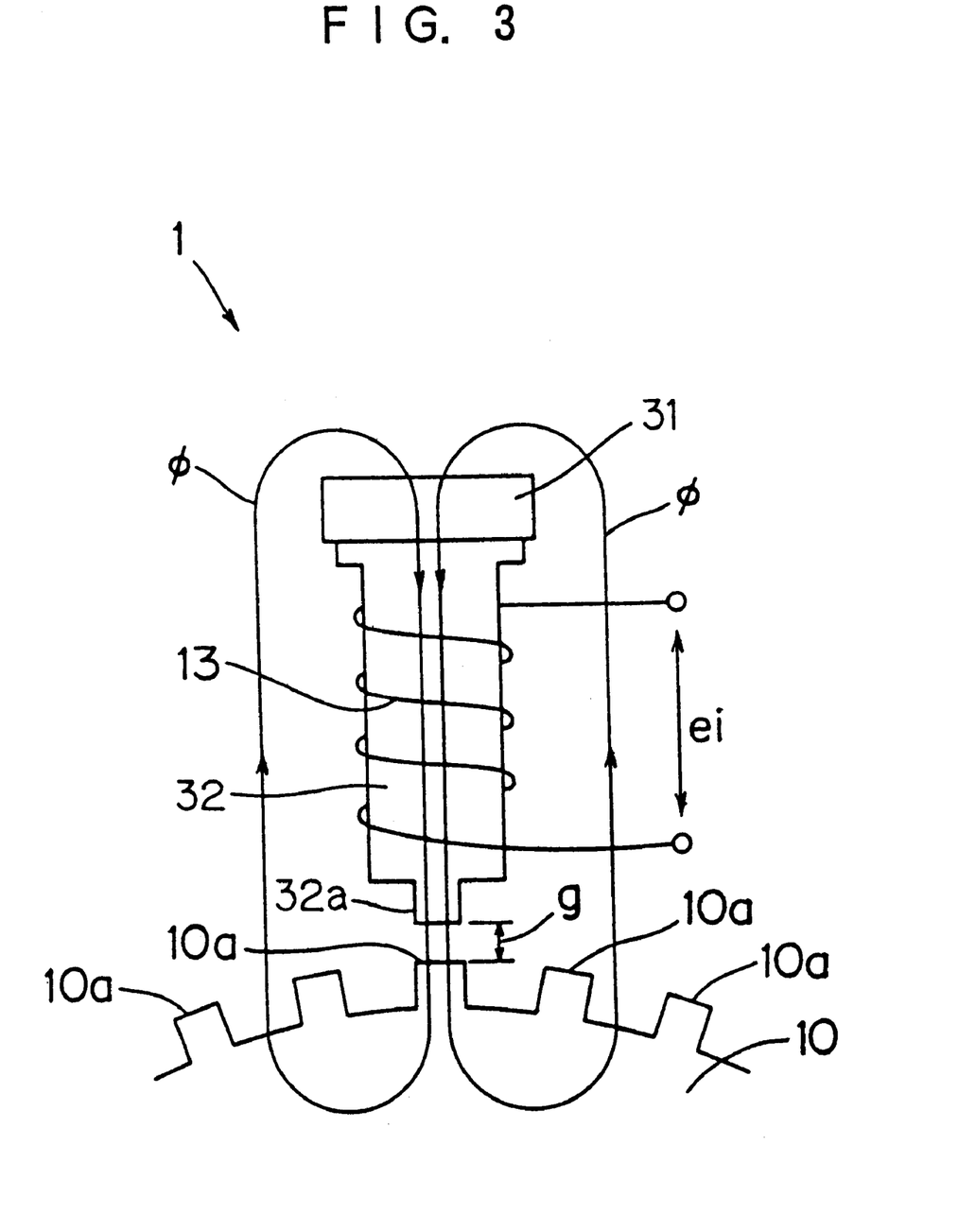
FIG. 3 is a view illustrating the principle of rotation detection using this wheel rotational velocity sensor 1.

FIG. 3 is a view illustrating the principle of rotation detection using the wheel rotational velocity sensor 1. The wheel rotational velocity sensor 1 is arranged to guide a magnetic flux $\phi$ formed by a permanent magnet 31 to the sensor rotor 10 by a pole piece 32, and to take out an electromotive force $e_i$ generated between the ends of a coil 13 wound around the pole piece 32. A gap g is formed between the tip 32a of the pole piece 32 and the sensor rotor 10. As mentioned earlier, the sensor rotor 10 is fixed to the axle 7 and rotated together with the rotation of the axle 7, i.e., the rotation of the tire. The sensor rotor 10 is provided on the peripheral surface thereof with a plurality of teeth 10a at a predetermined pitch as mentioned earlier. This causes the gap g between the tip 32a of the pole piece 32 and the peripheral surface of the sensor rotor 10 to vary with the rotation of the sensor rotor 10. The variation in gap g changes the magnetic flux φ passing through the pole piece 32, thereby generating an electromotive force $e_i$ according to the change in magnetic flux φ between the ends of the coil 13. Since the electromotive force $e_i$ varies with frequency corresponding to the rotation of the sensor rotor 10, a voltage signal $e_i$ corresponding to the rotational velocity of the tire is obtained.

In this embodiment, for example about 45 teeth of 10a project from the peripheral surface of the sensor rotor 10. Accordingly, when the sensor rotor 10 is rotated, the 45 teeth 10a are successively opposite to the tip 32a of the pole piece 32. Therefore, when the sensor rotor 10 makes one revolution, 45 AC signals are generated between the both ends of the coil 13.

Figure 4:
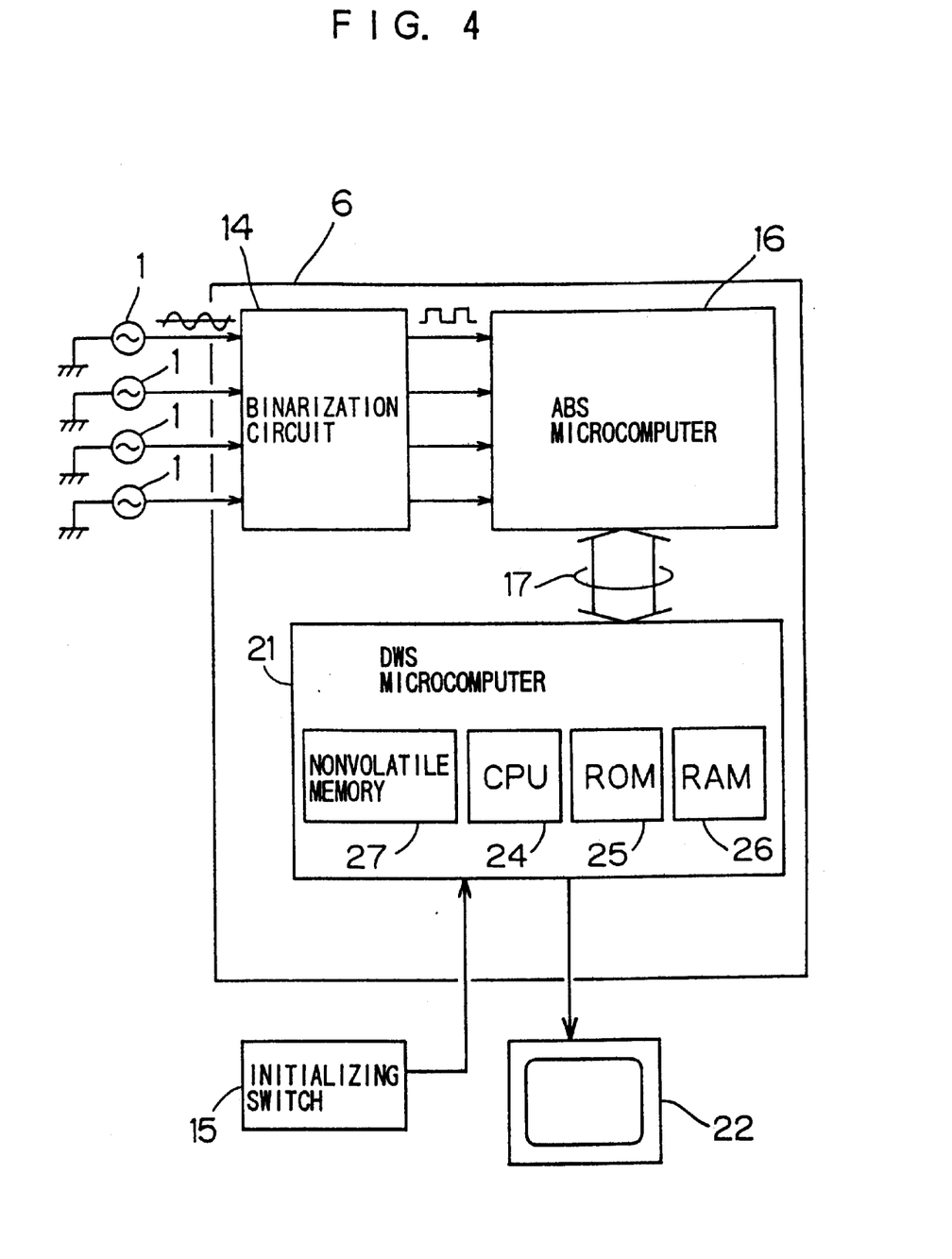
FIG. 4 is a block diagram illustrating an electric arrangement of ABS and DWS according to an embodiment of the present invention.

FIG. 4 is a block diagram illustrating an electric arrangement of ABS and DWS according to an embodiment of the present invention. As discussed in connection with FIG. 1, detection signals of the four wheel rotational velocity sensors 1 are supplied to the processing unit 6. The processing unit 6 comprises a binarization circuit 14, an ABS microcomputer 16 and a DWS microcomputer 21. Detection signals of the wheel rotational velocity sensors 1 supplied to the processing unit 6, are first binarized by the binarization circuit 14 and then supplied to the ABS microcomputer 16.

The DWS microcomputer 21 is arranged to receive information of wheel rotational velocity pulse number from the ABS microcomputer 16. Unlike the arrangement of the prior art in which those detection signals of the wheel rotational velocity sensors 1 binarized by the binarization circuit 14 are given directly to the DWS microcomputer 21, this embodiment is arranged such that the information of wheel rotational velocity pulse number is once latched by the ABS microcomputer 16 and then given to the DWS microcomputer 21.

Such a connection arrangement is greatly advantageous in that an I/O interface circuit for entering wheel rotational velocity pulses is not required, while such a circuit has been required by the DWS microcomputer of the prior art. The DWS microcomputer 21 for receiving the information of wheel rotational velocity pulse number is connected to a display device 22 and the initializing switch 15. As shown in FIG. 4, the DWS microcomputer 21 comprises, as a hardware arrangement: a CPU 24 serving as the center unit for an operational processing; a ROM 25 containing a control operation program of the CPU 24; a RAM 26 in which data or the like are to be temporarily written and from which written data are to be read when the CPU 24 conducts a control operation; and a nonvolatile memory 27 for holding the stored data even though the power is turned off.

When the DWS microcomputer 21 detects a tire reduced in air pressure based on the information of wheel rotational velocity pulse number given from the ABS microcomputer 16, the detection result is supplied to and displayed on the display device 22. The display device 22 comprises display lamps or display elements respectively corresponding to the four tires W1, W2, W3, W4 and is arranged such that, when a tire reduced in air pressure is detected, the display element corresponding to this tire comes on.

The operation of the initializing switch 15 in FIG. 4 will be discussed later.

With reference to FIG. 4, the following description will discuss how given information of wheel rotational velocity pulse number is latched by the DWS microcomputer 21.

Figure 5:
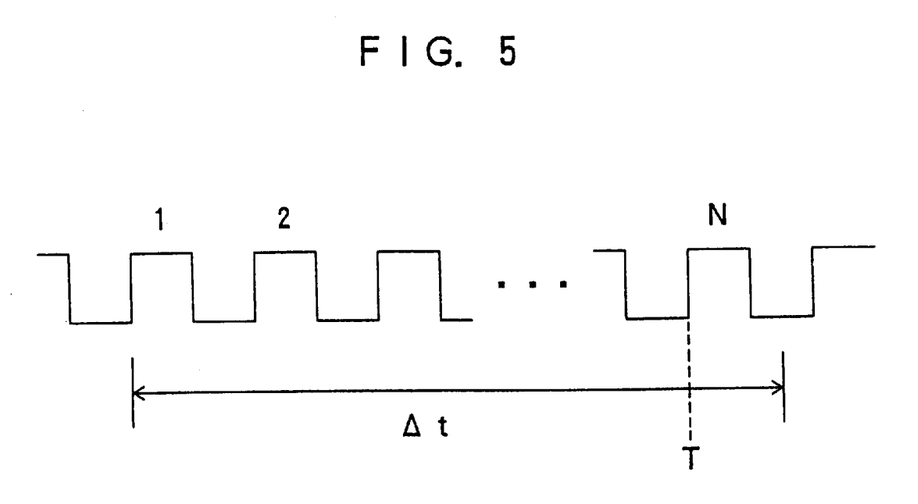
FIG. 5 is a view of a wave form of a wheel rotational velocity pulse.

Each of the wheel rotational velocity pulses entered into the ABS microcomputer 16 is a rectangular pulse signal as shown in FIG. 5. The ABS microcomputer 16 is arranged to count, per predetermined counting cycle Δt, the number of rising edges N of each of the given wheel rotational velocity pulses (hereinafter simply referred to as pulse number N), and to store the time T at which there is generated the rising edge last detected in each counting cycle Δt (hereinafter simply referred to as pulse generation time T) (See U.S. Pat. No. 5,591,906). Alternatively, the falling edges of each wheel rotational velocity pulse may be detected, instead of the rising edges.

Figure 6:
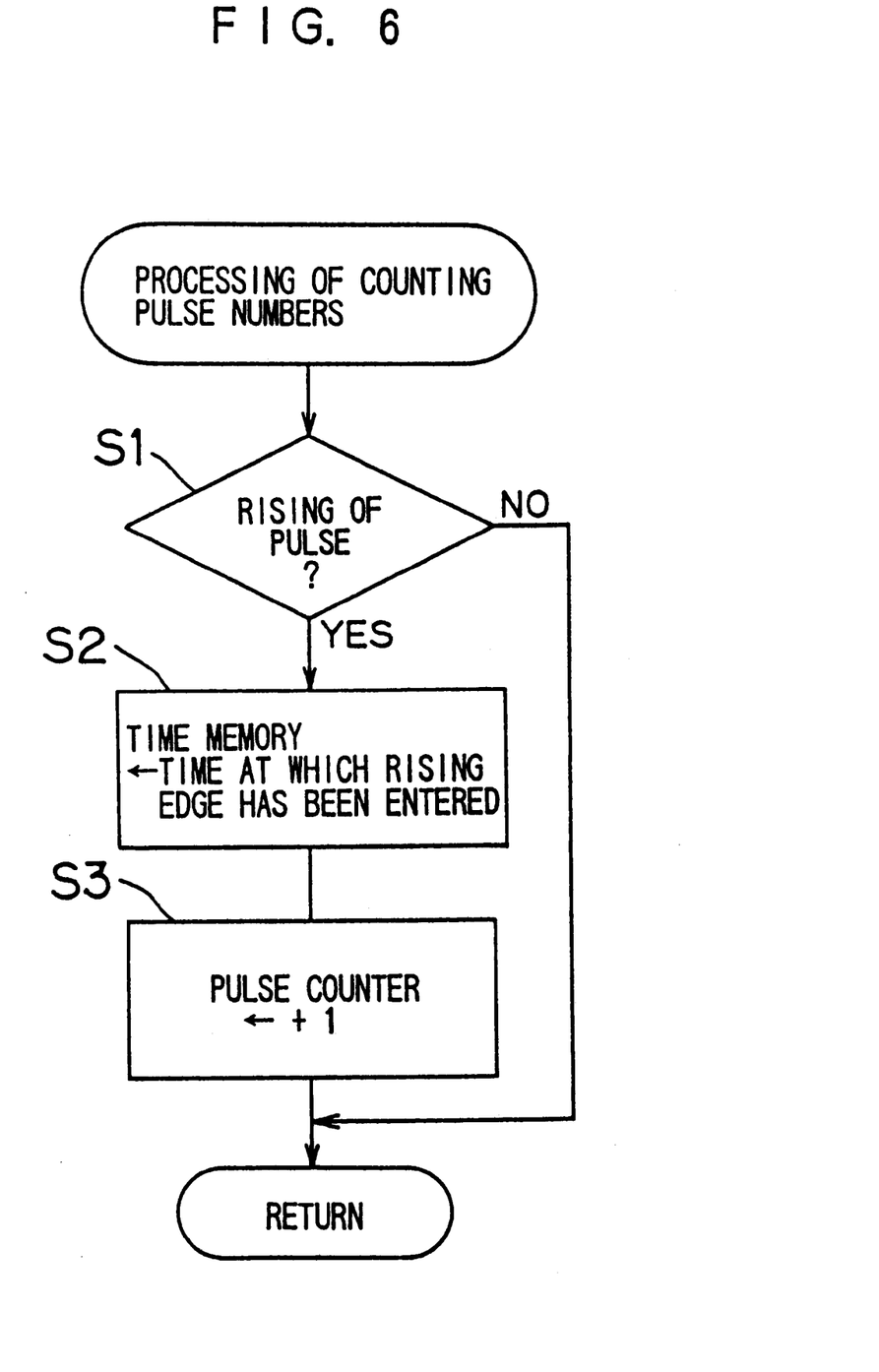
FIG. 6 is a flow chart illustrating a process of counting pulse numbers N and pulse generation times T in the ABS microcomputer.

Referring to a flow chart in FIG. 6, the following description will discuss a process of counting pulse numbers N and pulse generation times T in the ABS microcomputer 16.

In the ABS microcomputer 16, when an entry of a rising edge of a wheel rotational velocity pulse is detected (step S1), the time at which the rising edge has been entered is overwritten in a time memory (for which a memory area of the RAM 26 in FIG. 4 is used)(step S2). Then, the counted value of a pulse counter (for which a memory area of the RAM 26 is also used), is incremented by 1 (step S3). The operations above-mentioned are executed in parallel for the wheel rotational velocity pulses for the four wheels.

Figure 7:
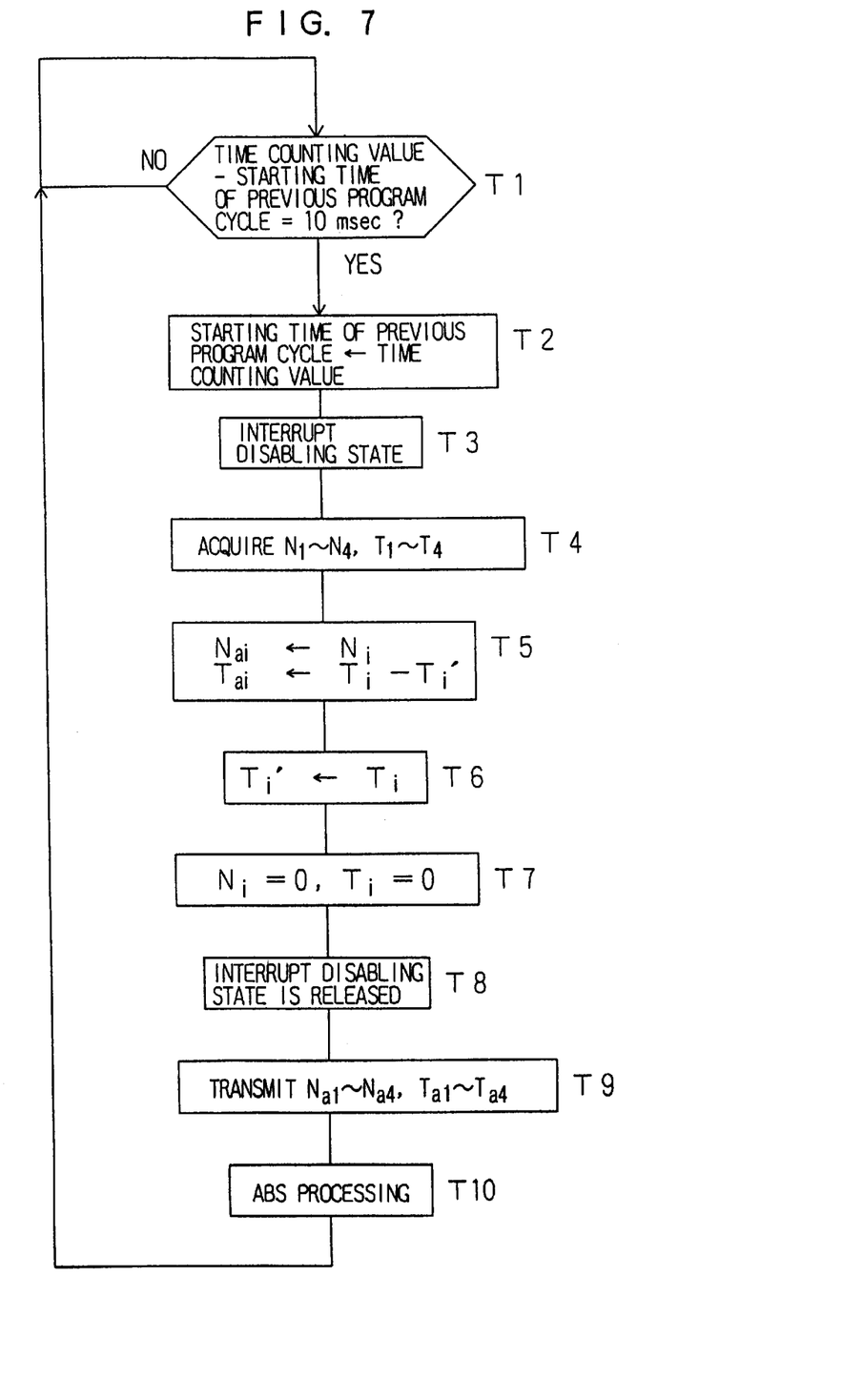
FIG. 7 is a flow chart illustrating a process of transmitting pulse numbers N and pulse generation times T in the ABS microcomputer.

Referring to a flow chart in FIG. 7, the following description will discuss a process of transmitting pulse numbers N and pulse generation times T in the ABS microcomputer 16.

The flow chart in FIG. 7 shows operations for one ABS-program cycle (for example, 10 msec). At the initial point of one program cycle, the ABS microcomputer 16 provides an interrupt disabling state (step T3) and acquires pulse numbers $N_1$, $N_2$, $N_3$, $N_4$ and pulse generation times $T_1$, $T_2$, $T_3$, $T_4$ (step T4). Each pulse number data is defined as $N_{ai}$ (i=1, 2, 3, 4) and each period of time from each pulse generation time $T_i'$ of a previous cycle to each pulse generation time $T_i$ of a current cycle is defined as pulse counting cycle data $T_{ai}$ (step T5). Thus, the following equations are established:

$$N_{ai} = N_i$$

$$T_{ai} = T_i - T_i'$$

When $N_{ai}$ and $T_{ai}$ are determined, the value of pulse generation time $T_i'$ of the previous cycle is replaced by $T_i$ (step T6), the acquired numbers $N_i$ and times $T_i$ are erased (step T7), the interrupt disabling state is released (step T8), and the pulse number data $N_{ai}$ and the pulse counting cycle data $T_{ai}$ are serially transmitted to the DWS microcomputer 21 through a communication line 17 (See FIG. 4) (step T9).

Then, a usual ABS process is executed (step T10). It is now supposed that the contents of the ABS program are determined such that the ABS process is completed within one ABS-program cycle. Upon completion of the ABS processing, the passage of 10 msec is confirmed (steps T1, T2) and the pulse numbers N and the pulse generation times T of a subsequent cycle are obtained and transmitted.

After the pulse number data $N_{a1}$ and pulse counting cycle data $T_{a1}$ thus transmitted are accumulated for a certain period of time in the DWS microcomputer 21, the DWS microcomputer 21 executes processing to detect tire air pressure reduction.

The data are accumulated for a certain period of time because the DWS is a tire air pressure reduction detecting system in which some delay in detection is allowed but no erroneous judgment is allowed, while a quick response is strongly required for the ABS which is a system for controlling the hydraulic pressure of brakes when the traveling vehicle is in an unstable state.

Figure 8:
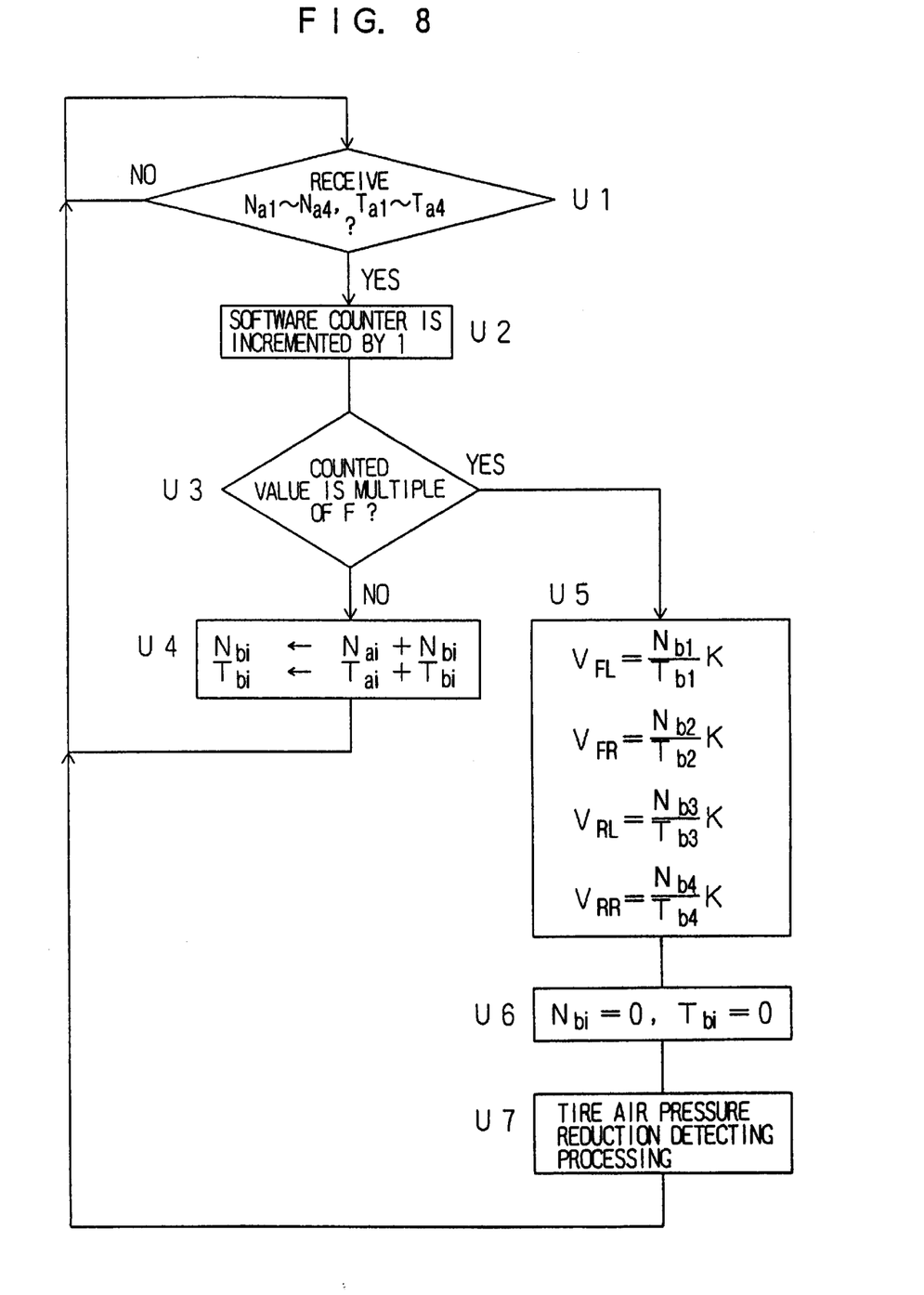
FIG. 8 is a flow chart illustrating a procedure for accumulating pulse numbers N and pulse generation times T and calculating the rotational angular velocities of tires in the DWS microcomputer.

FIG. 8 is a flow chart illustrating a procedure of accumulating pulse numbers N and pulse generation times T and calculating the rotational angular velocities of tires in the DWS microcomputer 21.

This flow chart shows the operations for one DWS-program cycle. When the DWS microcomputer 21 receives pulse number data $N_{ai}$ and pulse counting cycle data $T_{ai}$ through the communication line 17 (step U1), a software counter is incremented by 1 (step U2) and it is judged whether or not the counted value is a multiple of F (step U3). When the counted value is not a multiple of F, the pulse number data $N_{ai}$ are respectively added to pulse number accumulation buffers $N_{bi}$ and pulse counting cycle data $T_{ai}$ are respectively added to pulse counting cycle accumulation buffers $T_{bi}$ (step U4). Then, the sequence is returned to the step U1.

When the counted value is a multiple of F at the step U3, the sequence proceeds to the step U5. Here, F is basically the number of ABS-program cycles contained in one DWS-program cycle and is a value previously fixed in the non-volatile memory 27 or the like.

The counted value is increased if one DWS-program cycle is made long, thereby enabling the calculation of rotational angular velocity to be precisely made. On the contrary, if one DWS-program cycle is made excessively long, the number of iteration times of calculation of rotational angular velocity is reduced. Accordingly, a length of one DWS-program cycle is determined dependent on the requirements for the tire air pressure reduction detecting processing (whether emphasis is placed on the number of iteration times or precision).

At the step U5, a process of calculating the rotational angular velocities of the tires is executed.

This processing to calculate the rotational angular velocities of the tires is executed based on the following formulas:

$$V_{FL}=K*N_{b1}/T_{b1} \quad (1)$$

$$V_{FR}=K*N_{b2}/T_{b2} \quad (2)$$

$$V_{RL}=K*N_{b3}/T_{b3} \quad (3)$$

$$V_{RR}=K*N_{b4}/T_{b4} \quad (4)$$

wherein K is a constant relating to the number of teeth of the sensor rotor and * means to do multiplication.

When the wheel rotational angular velocities are calculated, $N_{bi}$ and $T_{bi}$ are erased (step U6) and the air pressure reduction detection process is conducted (step U7). The program contents may be determined such that the operations are finished within one ABS-program cycle, or that the operations are executed as divided into portions each of which is executed in a period of time corresponding to one ABS-program cycle. Upon completion of the tire air pressure reduction detection process, the DWS microcomputer 21 awaits pulse number data $N_{ai}$ and pulse counting cycle data $T_{ai}$ of a subsequent cycle (step U1).

The following description will discuss how to detect a reduction in tire air pressure.

There is obtained a ratio dF between the sum $V_{FL}+V_{RR}$ of the rotational angular velocities of a pair of the tires W1 and W4 on one diagonal line, and the sum $V_{FR}+V_{RL}$ of the rotational angular velocities of a pair of the tires W2 and W3 on the other diagonal line:

$$dF=(V_{FL}+V_{RR})/(V_{FR}+V_{RL}) \quad (5)$$

When the air pressures in the four tires W1, W2, W3, W4 is normal, $V_{FL}$ to $V_{RR}$ are equal to each other and dF is therefore equal to 1.

On the other hand, when any of the tires is reduced in air pressure, $dF \neq 1$. Accordingly, the following formula is established:

$$dF>(1+a_1) \text{ or } dF<(1-a_2) \quad (6)$$

However, when each of $a_1$ and $a_2$ is a threshold value, it can be detected that any of the tires is reduced in air pressure (See U.S. Pat. No. 5,591,906).

Further, according to the judgment made according to formula (6), the tire W1 or W4 is to be specified as a flated tire when dF is greater than 1 and the tire W2 or W3 is to be specified as a deflated tire when dF is not greater than 1. In straight driving of the motor vehicle, if $V_{FL}$ is greater than $V_{FR}$, the tire W1 is to be specified as a deflated tire; if $V_{FR}$ is greater than $V_{FL}$, the tire W2 is to be specified as a deflated tire; if $V_{RL}$ is greater than $V_{RR}$, the tire W3 is to be specified as a deflated tire; and if $V_{RR}$ is greater than $V_{RL}$, the tire W4 is to be specified as a deflated tire.

As is well known, it is preferred not to detect a reduction in tire air pressure when the motor vehicle is traveling at an extremely low speed, is suddenly accelerated or cornered, or when ABS, parking brakes, traction control device or the like is under operation.

Figure 9:
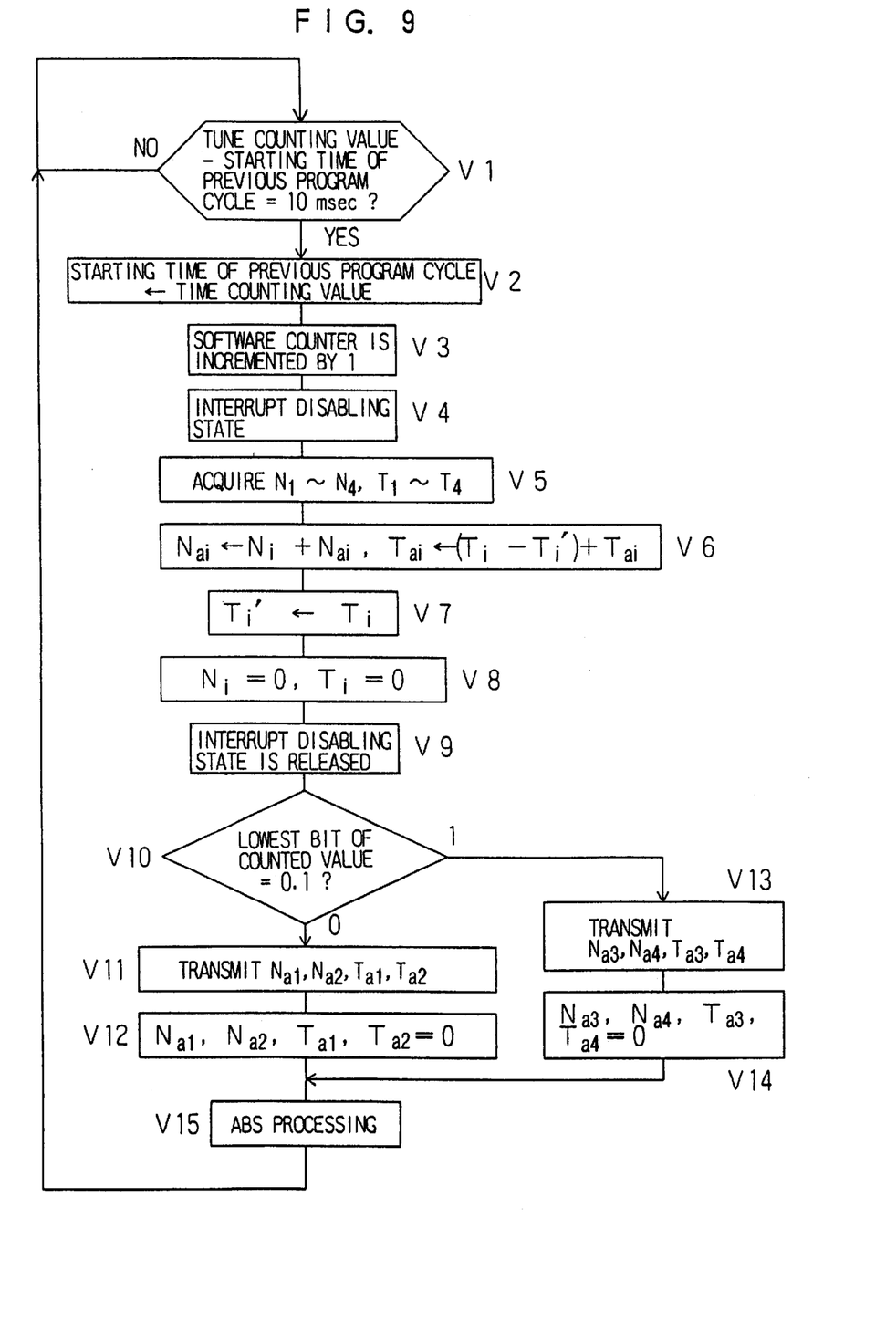
FIG. 9 is a flow chart illustrating a process of transmitting, at a single communication, information of pulse number N and pulse generation time T for two wheels out of the four wheels.

Using a flow chart in FIG. 9, the following description will discuss a process of transmitting, at a single communication, information of pulse number N and pulse generation time T for two wheels out of the four wheels.

This flow chart also shows operations for one ABS-program cycle (for example, 10 msec). At the initial point of time of one program cycle, the ABS microcomputer 16 increments the software counter by 1 (step V3) and provides a disabling interrupt state (step V4), acquires pulse numbers $N_1$, $N_2$, $N_3$, $N_4$ and pulse generation times $T_1$, $T_2$, $T_3$, $T_4$ (step V5). The pulse number data are respectively added to pulse number accumulation buffers $N_{ai}$ (i=1, 2, 3, 4), and each pulse counting cycle data or a period of time from each pulse generation time $T_i'$ of the previous cycle to each pulse generation time $T_i$ of the current cycle, is added to each pulse counting cycle accumulation buffer $T_{ai}$ (step V6). Thus, the following equations are established:

$$N_{ai}=N_i+N_{ai}$$

$$T_{ai}=(T_i-T_i')+T_{ai}$$

When $N_{ai}$ and $T_{ai}$ are determined, the value of each pulse generation time $T_i'$ of the previous cycle is replaced by each current generation time $T_i$ (step V7), the acquired values $N_i$ and $T_i$ are erased (step V8) and the disabling interrupt is released (step V9).

When the contents of the lowest bit of the counted value are 0 (even-numbered times), there are transmitted only the pulse number accumulation values $N_{a1}$, $N_{a2}$ and the pulse counting cycle accumulation values $T_{a1}$, $T_{a2}$ of the front wheels (step V11), and the sequence is initialized after the transmission (step V12). When the contents of the lowest bit of the counted value are 1 (odd-numbered times), there are transmitted only the pulse number accumulation values $N_{a3}$, $N_{a4}$ and the pulse counting cycle accumulation values $T_{a3}$, $T_{a4}$ of the rear wheels (step V13), and the sequence is initialized after the transmission (step V14).

Then, normal ABS processing is executed (step V15). When the ABS processing is finished, the passage of 10 msec is confirmed (steps V1, V2) and a process of acquiring pulse numbers N and pulse generation times T of the subsequent cycle and a processing of transmitting data for another two wheels are executed.

Figure 10:
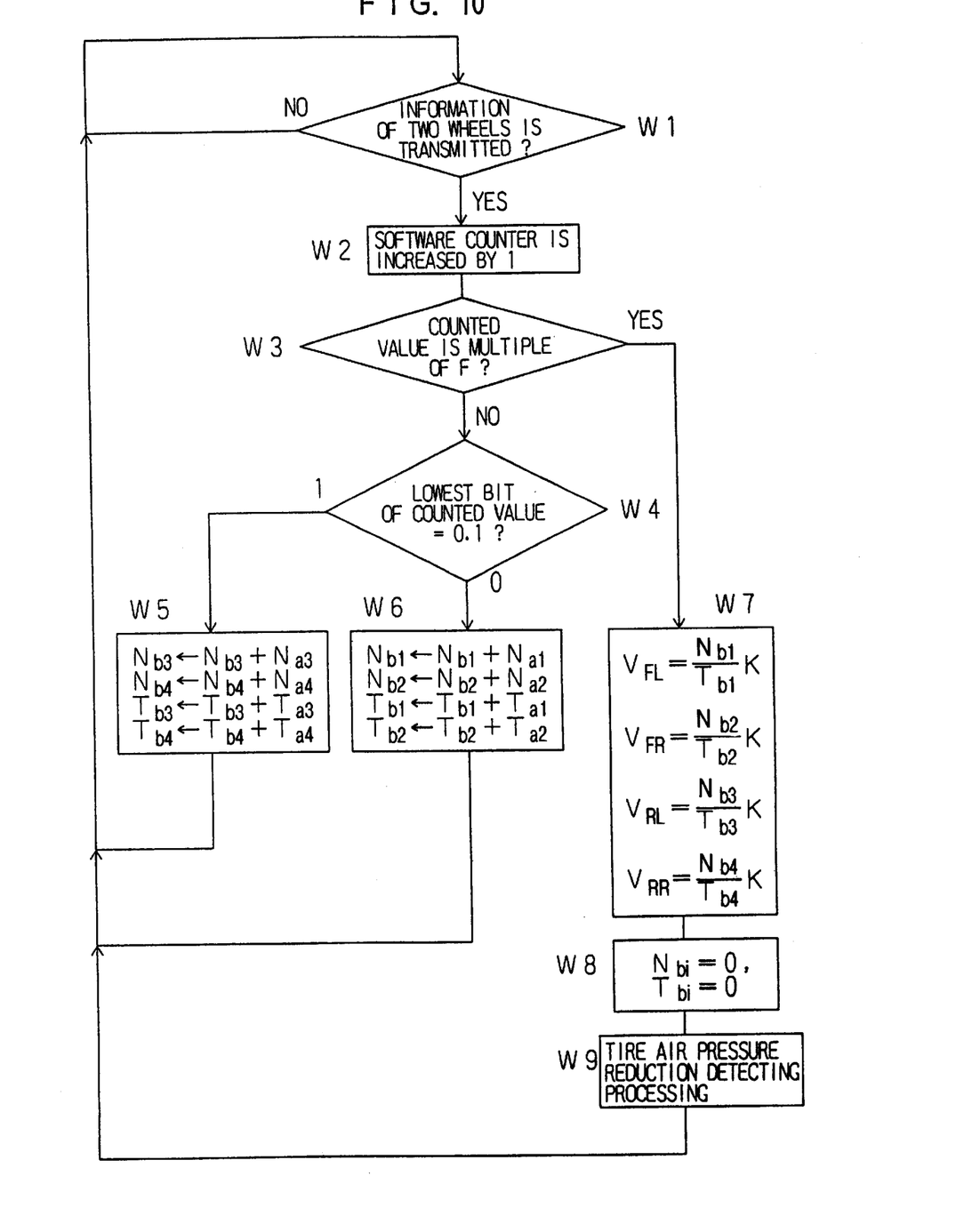
FIG. 10 is a flow chart illustrating a procedure for accumulating pulse numbers N and pulse generation times T and calculating the rotational angular velocities of the tires in the DWS microcomputer 21 when information of pulse number N and pulse generation time T for two wheels out of the four wheels has been transmitted at a single communication.

FIG. 10 is a flow chart illustrating a procedure of accumulating pulse numbers N and pulse generation times T and calculating the rotational angular velocities of tires in the DWS microcomputer 21 when information of pulse number N and pulse generation time T for two wheels out of the four wheels, is transmitted at a single communication.

The flow chart in FIG. 10 is different from the flow chart in FIG. 8 in that when pulse numbers N and pulse generation times T are to be accumulated, only transmitted data for two wheels are accumulated (steps W5, W6). Other operations are the same as the one shown in FIG. 8 and the description thereof is therefore omitted.

Information of pulse number N and pulse generation time T for two wheels out of the four wheels is transmitted at a single communication, and information of pulse number N and pulse generation time T for the four wheels, is therefore obtained at two communications. This reduces the amount of communication amount per communication to a half, thus reducing the communication overhead costs.

Figure 11:
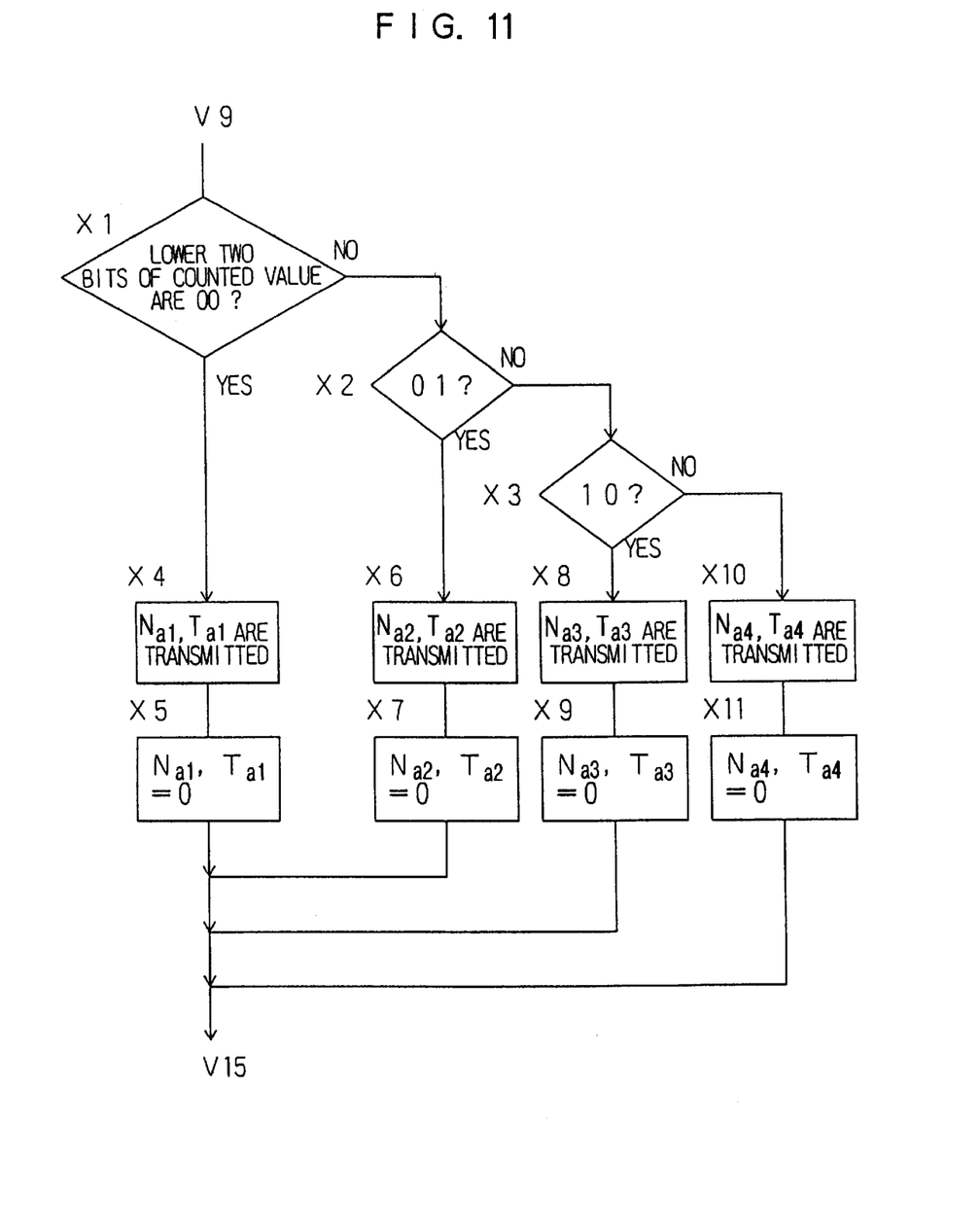
FIG. 11 is a flow chart illustrating main portions of a process of transmitting, at a single communication, information of pulse number N and pulse generation time T for each of the four wheels.

FIG. 11 shows main portions of a process for transmitting, at a single communication, information of pulse number N and pulse generation time T for each of the four wheels.

Unlike in the processing in FIG. 9, data are to be transmitted based on the contents of the lower two bits of a counted value. The pulse number accumulation value $N_{a1}$ and pulse counting cycle accumulation value $T_{a1}$ of the front left wheel alone are transmitted (step X4) when the lower two bits are 00 (step X1), the pulse number accumulation value $N_{a2}$ and pulse counting cycle accumulation value $T_{a2}$ of the front right wheel alone are transmitted (step X6) when the lower two bits are 01 (step X2), the pulse number accumulation value $N_{a3}$ and pulse counting cycle accumulation value $T_{a3}$ of the rear left wheel alone are transmitted (step X3) when the lower two bits are 10 and the pulse number accumulation value $N_{a4}$ and pulse counting cycle accumulation value $T_{a4}$ of the rear right wheel alone are transmitted (step X8) when the lower two bits are 11.

Thus, information of pulse number N and pulse generation time T for each of the four wheels is transmitted at a single communication, and information of pulse number N and pulse generation time T for the four wheels is therefore transmitted at four communications. This further reduces the communication amount per communication.

What is claimed is:

1. A tire air pressure reduction detecting apparatus for a four-wheel motor vehicle having four tires, comprising:

pulse output means respectively disposed with respect to the four tires for supplying pulses in proportion to rotation of the tires;

a first microcomputer which is connected to the pulse output means to count numbers of pulses supplied during pulse counting periods defined between pulse counting time points, the first microcomputer storing number and period data indicating the counted numbers and pulse counting periods, and executing specific processing based on the counted numbers of pulses and the pulse counting periods;

a communication line connected to the first computer so as to access the stored numbers and period data; and a second microcomputer, connected to the communication line so as to receive the stored number and period data from the first microcomputer through the communication lines, to calculate the rotational angular velocities of the four tires based on the received data and to compare the calculated rotational angular velocities of the four tires with one another, thereto to detect whether or not there is a tire reduced in air pressure.

2. A tire air pressure reduction detecting apparatus according to claim 1, wherein the communication line is a serial communication line, and the number and period data for the four wheels are transmitted at a single communication between the first and second microcomputers.

3. A tire air pressure reduction detecting apparatus according to claim 1, wherein the communication line is a serial communication line, and the number and period data for two wheels out of the four wheels are transmitted at a single communication between the first and second microcomputers and the number and period data for the other two wheels are transmitted in a succeeding communication processing.

4. A tire air pressure reduction detecting apparatus according to claim 1, wherein the communication line is a serial communication line, and the number and period data for each of the four wheels are transmitted at a single communication between the first and second microcomputers.

5. A tire air pressure reduction detecting apparatus according to claim 1, wherein the second microcomputer is arranged to accumulate, for a predetermined period of time, the number and period data received from the first microcomputer through the communication line, and to perform tire air pressure reduction detecting processing based on the accumulated number and period data.

* * * * *